(12) United States Patent
Rajpal et al.

(10) Patent No.: US 11,821,550 B2
(45) Date of Patent: Nov. 21, 2023

(54) INSERT FOR MOUNTING MULTIPLE CABLES IN CABLE HANGER

(71) Applicant: CommScope Technologies LLC, Hickory, NC (US)

(72) Inventors: Taig S. Rajpal, Chicago, IL (US); Ronald A. Vaccaro, Taylorsville, NC (US); Aviral Joshi, Chicago, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/516,902

(22) Filed: Nov. 2, 2021

(65) Prior Publication Data

US 2022/0057022 A1 Feb. 24, 2022

Related U.S. Application Data

(60) Division of application No. 17/000,918, filed on Aug. 24, 2020, now Pat. No. 11,181,210, which is a continuation of application No. 15/819,722, filed on Nov. 21, 2017, now Pat. No. 10,760,714.

(60) Provisional application No. 62/433,834, filed on Dec. 14, 2016.

(51) Int. Cl.
| | |
|---|---|
| *F16L 3/223* | (2006.01) |
| *F16L 3/137* | (2006.01) |
| *F16L 3/14* | (2006.01) |
| *H02G 3/32* | (2006.01) |
| *F16B 2/24* | (2006.01) |
| *F16L 3/233* | (2006.01) |

(52) U.S. Cl.
CPC ............ *F16L 3/2235* (2013.01); *F16B 2/241* (2013.01); *H02G 3/32* (2013.01); *F16L 3/137* (2013.01); *F16L 3/14* (2013.01); *F16L 3/233* (2013.01)

(58) Field of Classification Search
CPC .... Y10T 24/3439; Y10T 24/3444; F16B 2/08; F16L 3/137; F16L 3/14; F16L 3/233
USPC .............................................. 248/74.3, 230.8
See application file for complete search history.

(56) References Cited

U.S. PATENT DOCUMENTS

| | | |
|---|---|---|
| 924,090 A | 6/1909 | Moore |
| 1,376,284 A | 4/1921 | Kohn |
| 1,452,497 A | 4/1923 | Fischer |
| 1,982,501 A | 11/1934 | Douglas |
| 2,032,413 A | 3/1936 | Hall |
| 2,166,916 A | 7/1939 | Lombard |
| 2,179,406 A | 11/1939 | Ray |

(Continued)

FOREIGN PATENT DOCUMENTS

| | | |
|---|---|---|
| BR | 102014007903 A2 | 12/2015 |
| CN | 1520498 A | 8/2004 |

(Continued)

OTHER PUBLICATIONS

"English Translation of Second Office Action corresponding to Chinese Patent Application No. 201780067453.8 dated Jul. 20, 2020, 18 pages".

(Continued)

*Primary Examiner* — Alfred J Wujciak
(74) *Attorney, Agent, or Firm* — Myers Bigel, P.A.

(57) ABSTRACT

An insert for mounting multiple cables in a cable hanger includes: a gripping portion configured to engage multiple cables; and a wrapping portion attached to the gripping portion and configured to wrap around the gripping portion as it receives cables.

11 Claims, 4 Drawing Sheets

(56) References Cited

U.S. PATENT DOCUMENTS

| | | |
|---|---|---|
| 2,375,513 A | 8/1945 | Bach |
| 2,447,025 A | 8/1948 | Newman |
| 2,453,980 A | 11/1948 | Hartmann |
| 2,470,814 A | 5/1949 | Hain |
| 2,495,848 A | 1/1950 | Kiesel |
| 2,560,845 A | 7/1951 | Carpenter et al. |
| 2,605,865 A | 8/1952 | Liptay |
| 2,723,431 A | 11/1955 | Simon |
| 2,746,110 A | 5/1956 | Bedford |
| 2,990,150 A | 6/1961 | Weigel et al. |
| 3,042,352 A | 7/1962 | Stamper |
| 3,050,578 A | 8/1962 | Huebner |
| 3,163,712 A | 12/1964 | Cochran |
| 3,179,969 A | 4/1965 | Glynn |
| 3,189,961 A * | 6/1965 | Heller .................. F16L 33/035 24/20 CW |
| 3,404,858 A | 10/1968 | Erwin |
| 3,430,904 A | 3/1969 | Soltysik |
| 3,485,467 A | 12/1969 | Fuchs et al. |
| 3,501,117 A | 3/1970 | Soltysik |
| 3,536,281 A | 10/1970 | Meehan et al. |
| 3,599,915 A | 8/1971 | Soltysik |
| 3,916,089 A | 10/1975 | Alfred |
| 3,981,048 A | 9/1976 | Moody et al. |
| 4,148,113 A | 4/1979 | Dvorachek |
| 4,244,542 A | 1/1981 | Mathews |
| 4,244,544 A | 1/1981 | Kornat |
| 4,295,618 A | 10/1981 | Morota et al. |
| 4,306,697 A | 12/1981 | Mathews |
| 4,344,480 A | 8/1982 | Boyer et al. |
| 4,356,987 A | 11/1982 | Schmid |
| 4,441,680 A | 4/1984 | Rivkin et al. |
| 4,669,156 A | 6/1987 | Guido |
| 4,795,856 A | 1/1989 | Farmer |
| 4,813,639 A | 3/1989 | Midkiff et al. |
| D305,099 S | 12/1989 | Ono et al. |
| 5,035,383 A | 7/1991 | Rainville |
| 5,085,384 A | 2/1992 | Kasubke |
| 5,149,027 A | 9/1992 | Weber |
| 5,188,318 A | 2/1993 | Newcomer et al. |
| 5,320,312 A | 6/1994 | Hoenninger |
| 5,393,021 A | 2/1995 | Nelson |
| D357,802 S | 5/1995 | Todd et al. |
| 5,587,555 A | 12/1996 | Rinderer |
| 5,677,513 A | 10/1997 | Ito et al. |
| 5,833,188 A | 11/1998 | Studdiford et al. |
| 5,876,000 A | 3/1999 | Ismert |
| 5,878,465 A | 3/1999 | Jenner |
| 5,921,520 A | 7/1999 | Wisniewski |
| 5,971,329 A | 10/1999 | Hickey |
| 6,257,530 B1 | 7/2001 | Tsai |
| 6,317,933 B1 | 11/2001 | Suenaga |
| 6,323,430 B1 | 11/2001 | Finona |
| 6,354,543 B1 | 3/2002 | Paske |
| 6,580,867 B2 | 6/2003 | Galaj et al. |
| 6,899,305 B2 | 5/2005 | Korczak et al. |
| 6,935,001 B2 * | 8/2005 | Barriuso ............... F16L 3/2334 24/17 AP |
| 7,131,792 B2 | 11/2006 | Doverspike |
| 7,384,018 B2 | 6/2008 | Moretto |
| 7,500,644 B2 | 3/2009 | Naudet et al. |
| 7,518,058 B1 | 4/2009 | Hagbrandt et al. |
| D597,403 S | 8/2009 | Ho et al. |
| 7,651,056 B2 | 1/2010 | Tjerrild |
| 7,997,546 B1 | 8/2011 | Andersen et al. |
| 8,020,259 B2 | 9/2011 | Ho et al. |
| 8,020,811 B2 | 9/2011 | Nelson |
| 8,191,836 B2 | 6/2012 | Korczak |
| 8,439,316 B2 | 5/2013 | Feige |
| 8,541,682 B2 | 9/2013 | Mazelle et al. |
| 8,776,328 B2 | 7/2014 | Kodi |
| 8,785,779 B1 | 7/2014 | Jones et al. |
| 8,879,881 B2 | 11/2014 | Cote et al. |
| 9,127,789 B2 | 9/2015 | Caspari et al. |
| 9,206,927 B2 | 12/2015 | Carter et al. |
| 9,759,880 B2 | 9/2017 | Chamberlain et al. |
| 9,841,123 B1 | 12/2017 | White |
| 9,853,434 B2 | 12/2017 | Vaccaro |
| 9,866,004 B2 | 1/2018 | Vaccaro et al. |
| 9,879,803 B2 | 1/2018 | Leng |
| 9,903,510 B2 | 2/2018 | Joshi et al. |
| 9,995,414 B2 | 6/2018 | Joshi et al. |
| 10,215,308 B2 | 2/2019 | Bartos |
| 10,415,723 B2 | 9/2019 | Vaccaro et al. |
| 10,760,714 B2 | 9/2020 | Rajpal et al. |
| 10,823,312 B2 | 11/2020 | Vaccaro et al. |
| 10,935,105 B2 | 3/2021 | Bell et al. |
| 2002/0005463 A1 | 1/2002 | Paske et al. |
| 2002/0012582 A1 | 1/2002 | Kirkegaard et al. |
| 2003/0173470 A1 | 9/2003 | Geiger |
| 2004/0113027 A1 | 6/2004 | Nakanishi |
| 2004/0251386 A1 | 12/2004 | Mizukoshi et al. |
| 2005/0109887 A1 | 5/2005 | Catapano |
| 2005/0109890 A1 | 5/2005 | Korczak et al. |
| 2005/0253025 A1 | 11/2005 | Benoit et al. |
| 2006/0108480 A1 | 5/2006 | Goodwin et al. |
| 2006/0237217 A1 | 10/2006 | Glew |
| 2006/0249633 A1 | 11/2006 | Korczak et al. |
| 2007/0007397 A1 | 1/2007 | Nelson |
| 2007/0120023 A1 | 5/2007 | Martinez et al. |
| 2007/0246616 A1 | 10/2007 | Budagher |
| 2008/0115448 A1 | 5/2008 | Kodi |
| 2008/0093510 A1 | 8/2008 | Oh et al. |
| 2009/0230256 A1 | 9/2009 | Widlacki et al. |
| 2009/0242715 A1 | 10/2009 | Kosidlo et al. |
| 2009/0294602 A1 | 12/2009 | Korczak |
| 2010/0084520 A1 | 4/2010 | Ohno |
| 2011/0107719 A1 | 5/2011 | Kodi |
| 2011/0226913 A1 | 9/2011 | Feige |
| 2011/0260025 A1 | 10/2011 | Aoshima et al. |
| 2011/0283515 A1 | 11/2011 | Korczak |
| 2012/0045608 A1 | 2/2012 | Huchet et al. |
| 2012/0085577 A1 | 4/2012 | Eshima et al. |
| 2012/0305724 A1 | 12/2012 | Diez et al. |
| 2013/0104494 A1 | 5/2013 | Evangelista et al. |
| 2013/0146720 A1 | 6/2013 | Meyers et al. |
| 2013/0146721 A1 | 6/2013 | White |
| 2013/0175407 A1 | 7/2013 | Williams et al. |
| 2013/0187012 A1 | 7/2013 | Blakeley et al. |
| 2013/0320157 A1 | 12/2013 | Carter et al. |
| 2013/0320182 A1 | 12/2013 | Kataoka et al. |
| 2014/0054425 A1 | 2/2014 | Cheol |
| 2014/0259620 A1 | 9/2014 | Hicks et al. |
| 2014/0260083 A1 | 9/2014 | Zhang et al. |
| 2015/0136473 A1 | 5/2015 | Jafari et al. |
| 2015/0155669 A1 | 6/2015 | Chamberlain et al. |
| 2015/0159781 A1 | 6/2015 | Wilson et al. |
| 2016/0281881 A1 | 9/2016 | Vaccaro et al. |
| 2016/0281883 A1 | 9/2016 | Vaccaro |
| 2016/0327187 A1 | 11/2016 | Brown |
| 2016/0341340 A1 | 11/2016 | Fernandes |
| 2017/0122460 A1 | 5/2017 | Joshi et al. |
| 2018/0045336 A1 | 2/2018 | Vaccaro |
| 2018/0172183 A1 | 6/2018 | Joshi et al. |
| 2018/0202580 A1 | 7/2018 | Joshi et al. |
| 2020/0041039 A1 | 2/2020 | Varale |
| 2021/0151971 A1 | 5/2021 | Vaccaro |

FOREIGN PATENT DOCUMENTS

| | | |
|---|---|---|
| CN | 101589513 A | 11/2009 |
| DE | 845808.1 C | 8/1952 |
| DE | 2401187 A1 | 1/1975 |
| DE | 2903306 A1 | 8/1979 |
| DE | 2921891 A1 | 12/1980 |
| DE | 3823578 A1 | 2/1989 |
| DE | 202015007620.3 U1 | 12/2015 |
| DE | 102017106520 A1 | 9/2018 |
| EP | 3539191 A2 | 9/2019 |
| FR | 2145985 A6 | 2/1973 |
| FR | 2176184 A5 | 10/1973 |
| GB | 1599416 A | 9/1981 |
| GB | 2203433 | 10/1988 |
| JP | 61200974 | 12/1986 |

(56) References Cited

FOREIGN PATENT DOCUMENTS

| | | |
|---|---|---|
| JP | 886386 | 4/1996 |
| JP | 9144719 | 6/1997 |
| JP | 10019168 | 1/1998 |
| JP | 11223281 | 8/1999 |
| JP | 2002130539 A | 5/2002 |
| JP | 3653346 B2 | 3/2005 |
| JP | 2012002323 A | 1/2012 |
| JP | 2012222986 A | 11/2012 |
| JP | 5775283 B2 | 7/2015 |
| KR | 101399938 B1 | 6/2014 |
| WO | 2002095956 | 11/2002 |
| WO | 2008082595 A1 | 7/2008 |
| WO | 2010143222 A1 | 12/2010 |

OTHER PUBLICATIONS

"Examination Report corresponding to European Application No. 17870023.3 dated May 31, 2021".
"Examination Report corresponding to European Application No. 17870144.7 dated Apr. 22, 2021".
"Examination Report corresponding to European Application No. 17875334.9 dated Oct. 14, 2021".
"Extended European Search Report corresponding to European Application No. 17870023.3 dated Jun. 3, 2020".
"Extended European Search Report corresponding to European Application No. 17870144.7 dated Jun. 3, 2020".
"Extended European Search Report corresponding to European Application No. 17875334.9 dated Jun. 2, 2020".
"Extended European Search Report corresponding to European Patent Application No. 17892843.8 dated Oct. 1, 2020, 8 pages".
"International Preliminary Report on Patentability corresponding to International Application No. PCT/US2017/056019 dated May 23, 2019".
"International Preliminary Report on Patentability corresponding to International Application No. PCT/US2017/060115 dated May 23, 2019".
"International Preliminary Report on Patentability corresponding to International Application No. PCT/US2017/062730 dated Jun. 13, 2019".
"International Preliminary Report on Patentability corresponding to International Application No. PCT/US2017/062743 dated Jun. 27, 2019".
"International Preliminary Report on Patentability corresponding to International Application No. PCT/US2017/068510 dated Aug. 1, 2019".
"International Preliminary Report on Patentability corresponding to International Application No. PCT/US2019/042952 dated Feb. 11, 2021".
"Notification of Transmittal of the International Search Report and the Written Opinion of the International Searching Authority, or the Declaration corresponding to International Application No. PCT/US2017/056019 dated Jan. 24, 2018".
"Notification of Transmittal of the International Search Report and the Written Opinion of the International Searching Authority, or the Declaration corresponding to International Application No. PCT/US2017/060115 dated Feb. 14, 2018".
"Notification of Transmittal of the International Search Report and the Written Opinion of the International Searching Authority, or the Declaration corresponding to International Application No. PCT/US2017/062730 dated Mar. 13, 2018".
"Notification of Transmittal of the International Search Report and the Written Opinion of the International Searching Authority, or the Declaration corresponding to International Application No. PCT/US2017/062743 dated Mar. 12, 2018".
"Notification of Transmittal of the International Search Report and the Written Opinion of the International Searching Authority, or the Declaration corresponding to International Application No. PCT/US2017/065801 dated Apr. 13, 2018".
"Notification of Transmittal of the International Search Report and the Written Opinion of the International Searching Authority, or the Declaration corresponding to International Application No. PCT/US2017/068510 dated Apr. 17, 2018".
"Notification of Transmittal of the International Search Report and the Written Opinion of the International Searching Authority, or the Declaration corresponding to International Application No. PCT/US2019/042952 dated Nov. 8, 2019".
"Office Action corresponding to Chinese Application No. 201780065736.9 dated Mar. 2, 2020".
"Office Action corresponding to Chinese Application No. 201780067453.8 dated Jan. 22, 2020".
"Office Action corresponding to Chinese Application No. 201780067453.8 dated Oct. 22, 2020".
"Office Action corresponding to Chinese Application No. 201780067503.2 dated Feb. 3, 2020".
"Office Action corresponding to Chinese Application No. 201780075195.8 dated Mar. 29, 2021".
"Office Action corresponding to Chinese Application No. 201780075195.8 dated Jan. 21, 2020".
"Office Action corresponding to Chinese Application No. 201780075195.8 dated Nov. 3, 2020".
"Office Action corresponding to Chinese Application No. 201780075198.5 dated Jan. 21, 2020".

* cited by examiner

INSERT FOR MOUNTING MULTIPLE CABLES IN CABLE HANGER

RELATED APPLICATION

The present application is a divisional of and claims priority to U.S. patent application Ser. No. 17/000,918, filed Aug. 24, 2020, now allowed, which is a continuation of and claims priority to U.S. patent application Ser. No. 15/819,722, filed Nov. 21, 2017, now U.S. Pat. No. 10,760,714, which claims priority from and the benefit of U.S. Provisional Patent Application No. 62/433,834, filed Dec. 14, 2016, the disclosure of which is hereby incorporated herein in its entirety.

FIELD OF THE INVENTION

The present invention relates generally to devices for supporting cables and, in particular, to hangers for securing cables to support structures.

BACKGROUND OF THE INVENTION

Cable hangers are commonly used to secure cables to structural members of antenna towers and or along tunnel walls. Generally, each cable is attached to a structural member by cable hangers mounted at periodically-spaced attachment points.

Antenna towers and of tunnels may be crowded due to the large numbers of cables required for signal-carrying. Over time, as systems are added, upgraded and/or expanded, installation of additional cables may be required. To conserve space, it may be desirable for each set of cable hangers to secure more than a single cable. Certain cable hangers have been constructed to secure multiple cables; other cable hangers have a stackable construction that permits multiple cable hangers to be interlocked extending outwardly from each mounting point/structural member. Stacked and multiple-cable-type cable hangers significantly increase the number of cables mountable to a single attachment point.

Figure 1:
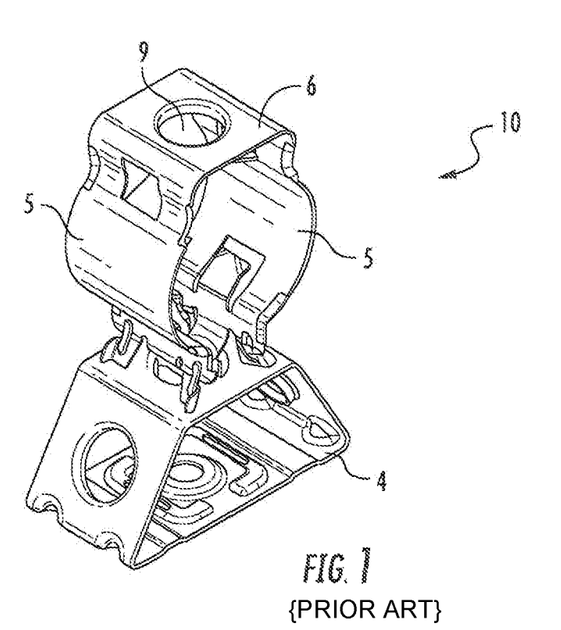
FIG. 1 is a perspective view of a prior art cable hanger.
Figure 2:
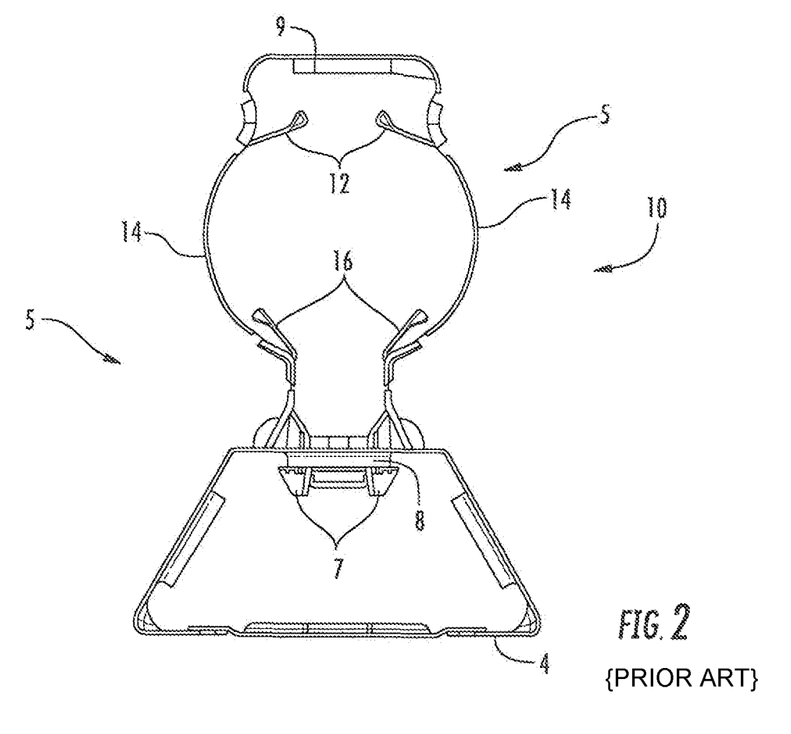
FIG. 2 is a top view of the prior art cable hanger of FIG. 1.

One popular stackable cable hanger is discussed in U.S. Pat. No. 8,191,836 to Korczak, the disclosure of which is hereby incorporated herein by reference in its entirety. One such cable hanger, designated broadly at 10, is shown in FIGS. 1 and 2. The hanger 10 includes curved arms 5 that extend from a flat base 6. Locking projections 7 extend from the free ends of the arms 5. As can be seen in FIGS. 1 and 2, the locking projections 7 are inserted into a reinforced hole 8 in a tower structure 4 to mount the hanger 10 thereon. The base 6 of the hanger 10 includes a reinforced hole 9 that can receive the projections of another hanger 10 to mount a second cable.

As can be best seen in FIG. 2, the arms 5 include arcuate sections 14 that together generally define a circle within which a cable can reside. Two cantilevered tabs 12 extend radially inwardly and toward the base 6 at one end of the arcuate sections 14, and two cantilevered tabs 16 extend radially inwardly and toward the base 6 from the opposite ends of the arcuate sections 14. The cantilevered tabs 12, 16 are deployed to deflect radially outwardly when the hanger 10 receives a cable for mounting; this deflection generates a radially, inward force from each tab 12, 16 that grips the jacket of the cable.

Hangers can be "stacked" onto each other by inserting the locking projections 7 of one hanger into the large hole 9 of the next hanger. One variety of cable hanger of this type is the SNAP-STAK® hanger, available from CommScope, Inc. (Joliet, Ill.).

The SNAP-STAK® hanger is offered in multiple sizes that correspond to the outer diameters of different cables. This arrangement has been suitable for use with RF coaxial cables, which tend to be manufactured in only a few different outer diameters; however, the arrangement has been less desirable for fiber optic cables, which tend to be manufactured in a much greater variety of diameters. Moreover, fiber optic cables tend to be much heavier than coaxial cables (sometimes as much as three times heavier per unit foot), which induces greater load and stress on the hangers.

Figure 3:
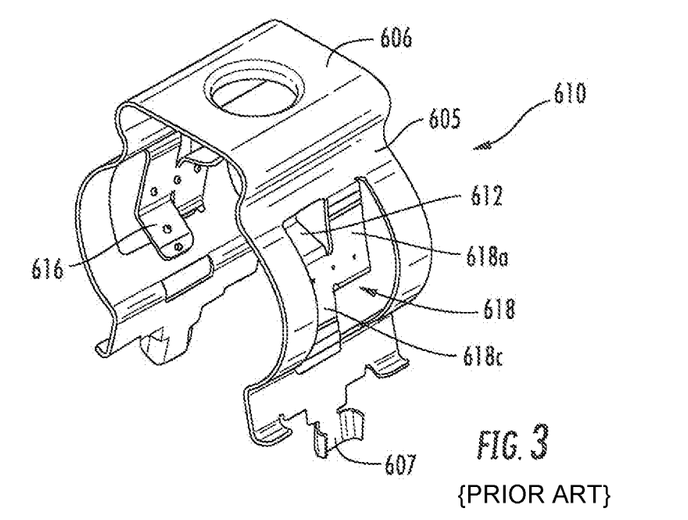
FIG. 3 is a perspective view of another prior art cable hanger.
Figure 4:
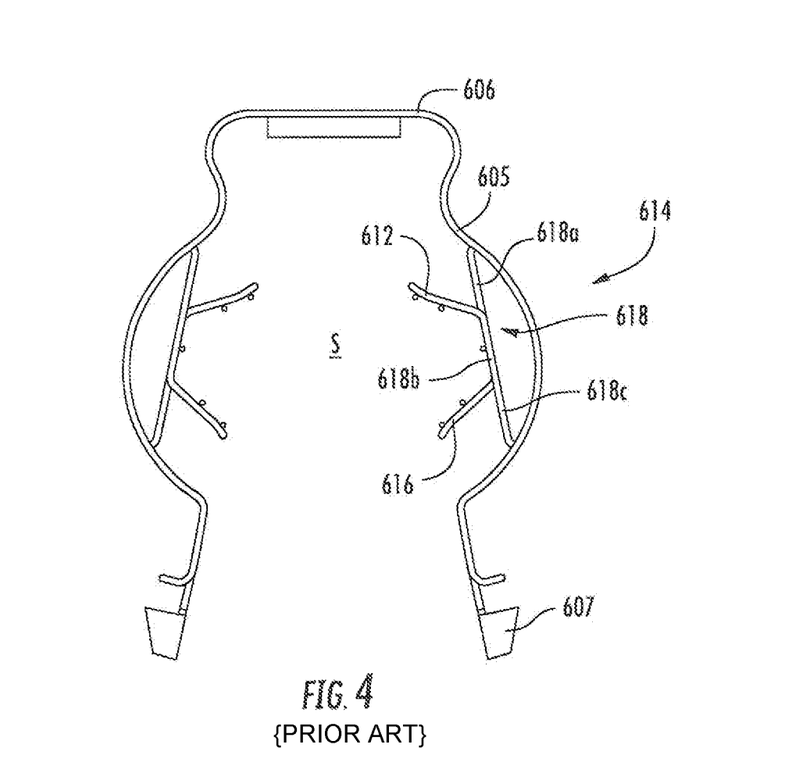
FIG. 4 is a top view of the cable hanger of FIG. 3.

Multiple approaches to addressing this issue are offered in co-assigned and co-pending U.S. Patent Publication No. 2016/0281881 to Vaccaro, the disclosure of which is hereby incorporated herein by reference in full. One cable hanger discussed in this publication is shown in FIGS. 3 and 4 and designated broadly at 610 therein. The cable hanger 610 is somewhat similar to the cable hanger 10, inasmuch as it has a base 606, curved arms 605 and locking projections 607 that resemble those of the hanger 10 discussed above. However, the cable hanger 610 also has flex members 618 that define chords across the arcuate sections 614 of the arms 605. As can be seen in FIG. 4, cantilevered gripping members 612, 616 extend from the flex members 618 and into the cable-gripping space S within the arms 605. It can also be seen in FIG. 3 that the flex members 618 are tripartite, with two vertically offset horizontal runs 618a, 618c merging with the arcuate sections 614 of the arms 605 and a vertical run 618b extending between the horizontal rains 618a, 618e. The gripping members 612, 616 extend from opposite sides of the vertical run 618b and are vertically offset from each other.

In use, the cable hanger 610 is employed in the same manner as the cable hanger 10; a cable is inserted into the space S between the arms 605, which are then closed around the cable as the locking projections 607 are inserted into a mounting hole. The cantilevered gripping members 612, 616 can help to grip and to center the cable within the space S. The presence of the flex members 618, which are fixed end beams rather than cantilevered tabs, can provide additional gripping force beyond that of the cable hanger 10.

In view of the foregoing, it may be desirable to provide additional configurations of cable hangers to enable a technician to adapt to different cable sizes and mounting conditions.

SUMMARY

As a first aspect, embodiments of the invention are directed to an insert for mounting multiple cables in a cable hanger. The insert comprises: a gripping portion configured to engage multiple cables; and a wrapping portion attached to the gripping portion and configured to wrap around the gripping portion as it receives cables.

In some embodiments, the insert may be employed in combination with a cable hanger and multiple cables, wherein the multiple cables are received in the gripping portion, the wrapping portion is wrapped around the gripping portion, and the insert is received in the cable hanger.

As a second aspect, embodiments of the invention are directed to an insert for mounting multiple cables in a cable hanger, comprising: a gripping portion configured to engage multiple cables, the gripping portion having a central body and a plurality of recesses configured to receive cables; and a wrapping portion attached to the gripping portion and configured to wrap around the gripping portion as it receives cables. The insert is a monolithic component formed of a polymeric or elastomeric material.

As a third aspect, embodiments of the invention are directed to an insert for mounting multiple cables in a cable hanger, comprising: a gripping portion configured to engage multiple cables; and a wrapping portion attached to the gripping portion and configured to wrap around the gripping portion as it receives cables. The gripping portion and the wrapping portion are formed of a monolithic strip of metallic material.

DETAILED DESCRIPTION

The present invention is described with reference to the accompanying drawings, in Which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "au" and "the" are intended to include the plural forms as well, unless the context clearly indicates otherwise. It will also be understood that when an element a device, circuit, etc.) is referred to as being "attached", "connected" or "coupled" to another element, it can be directly connected or coupled to the other element or intervening elements may be present. In contrast, when an element is referred to as being "directly attached", "directly connected" or "directly coupled" to another element, there are no intervening elements present.

Figure 5:
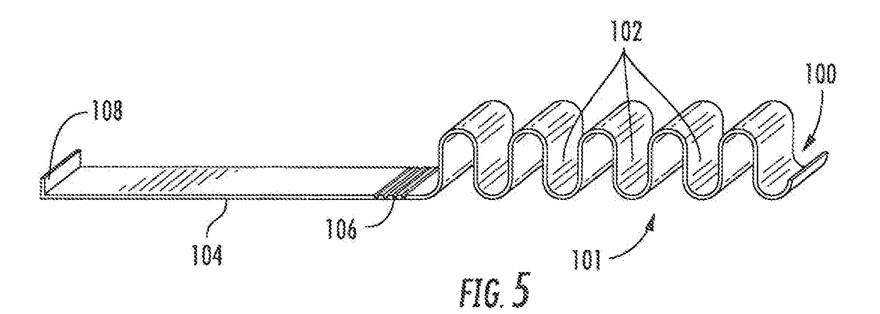
FIG. 5 is a top view of a cable hanger insert capable of mounting multiple cables according to embodiments of the invention, with the insert in its unrolled condition.

Referring now to the drawings, a cable hanger insert, designated broadly at 100, is shown in FIG. 5. The insert 100 is formed from a unitary strip, such as steel, that includes a gripping portion 101 with a plurality of undulations 102 and a wrapping portion 104. One of more slots 106 are present in the wrapping portion 104 adjacent the undulation 102 nearest the wrapping portion 104. A hook or other fastening feature 108 extends from the free end of the wrapping portion 104.

Figure 6:
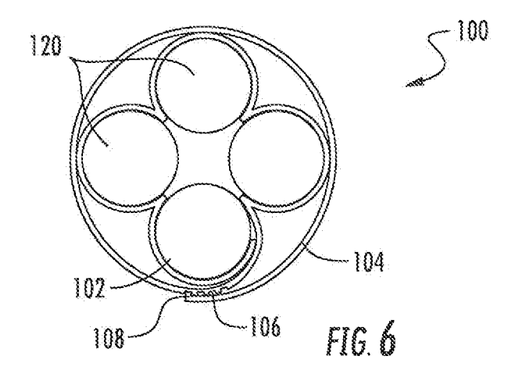
FIG. 6 is a top view of the cable hanger insert of FIG. 5 in a rolled condition with multiple cables captured therein.

The insert 100 is shown in FIG. 5 in an unrolled (and in this instance generally flat) condition. As can be seen in FIG. 6, the insert 100 can be formed into a rolled condition in which wrapping portion 104 wraps around the undulations 102 of the gripping portion 101, such that the undulations 102 are positioned radially inwardly from the wrapping portion 104. The hook 108 is inserted into one of the slots 106 to maintain the insert 100 in the rolled condition.

As can be seen from FIG. 6, any or all of the undulations 102 may serve as receptacles that capture and grasp a cable 120. In some embodiments, the rolling of the insert 100 into the rolled condition of FIG. 6 will cause each of the undulations 102 to collapse somewhat, which may provide additional gripping force for the undulations 102. Thus, the undulations 102 may be sufficiently wide to receive a cable 120 with no or minimal insertion force when the insert 100 is unrolled as in FIG. 5, but will grip the cables 120 tightly when the insert 100 is rolled into the rolled condition of FIG. 6.

The undulations 102 may be of any size desired to hold cable. Typically, the undulations 102 are sized to hold cables 120 sized at 4 to 17 mm in diameter.

Figure 7:
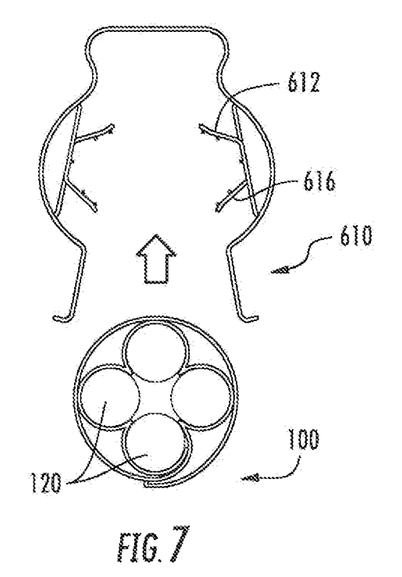
FIG. 7 is a top view of the cable hanger insert and cables of FIG. 6 being mounted in a cable hanger such as that of FIGS. 3 and 4.
Figure 8:
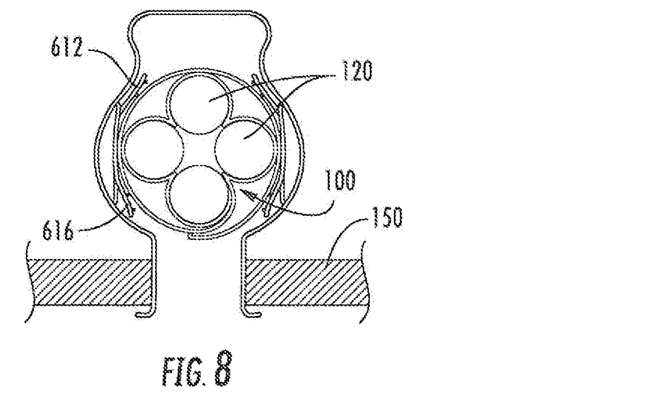
FIG. 8 is a top view of the cable hanger insert, cables and cable hanger of FIG. 7 with the insert mounted in the cable hanger and the cable hanger mounted to a mounting structure.

As can be seen in FIG. 7, once the cables 120 are inserted into the insert 100 and the insert 100 is rolled into the rolled condition, the insert 100 and cables 120 can be inserted into a conventional cable hanger, such as that shown in FIG. 3 at 610. The gripping members 612, 616 of the cable hanger 610 can grip the insert 100 and cables 120. Once the insert 100 and cables 120 are received by the cable hanger 610, the cable hanger 610 can be mounted onto a mounting structure 150 (such as an antenna tower or the like) in a conventional manner (FIG. 8).

The insert 100 may be formed of a variety of materials, such as steel and other metals. The insert 100 may be stamped from a sheet of material, such as steel, and bent by known methods into the configuration shown in FIG. 5. As such, the insert 100 may be a monolithic component.

Figure 9:
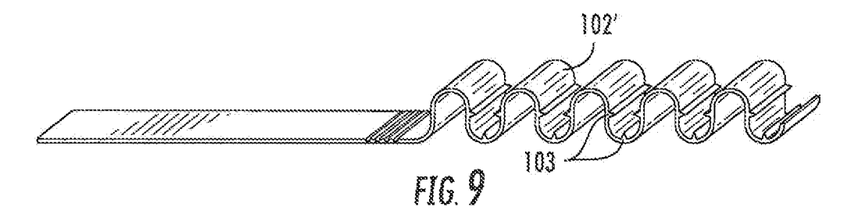
FIG. 9 is a top view of a cable hanger insert according to alternative embodiments of the invention shown in an unrolled condition.

Referring now to FIG. 9, another embodiment of a cable hanger insert, designated broadly at 100', is illustrated therein. The insert 100' is similar to that of the insert 100 with the exception that the undulations 102' include cable gripping features 103. The cable gripping features 103 may be barbs, lances, teeth, or other grip-enhancing features. In some embodiments, the gripping features 103 may be bent or struck from the sheet of material used to form the insert 100.

Figure 10:
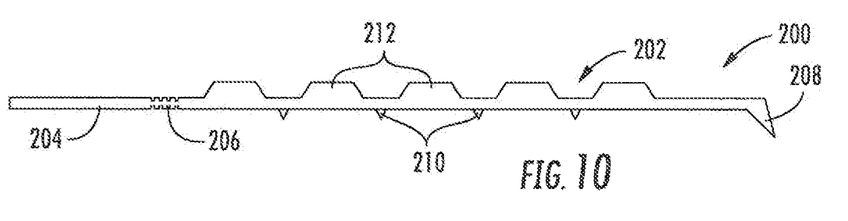
FIG. 10 is a top view of a cable hanger insert according to further embodiments of the invention, the cable hanger insert shown in its unrolled condition.

Referring now to FIG. 10, another cable hanger insert, designated broadly at 200, is shown therein. The insert 200 comprises a wrapping portion 204 with slots 206 similar to those of the insert 100. However, rather than undulations, the insert 200 has a gripping portion 202 that includes gripping features 210 such as barbs, nubs, lances and the like on one side thereof. On the opposite side of the gripping portion, a series of discontinuous flanges 212 extend from one edge of the gripping portion 202 away from the gripping features 210 (see also FIG. 12). A latch 208 extends from the free end of the gripping portion 202.

Figures 11, 12:
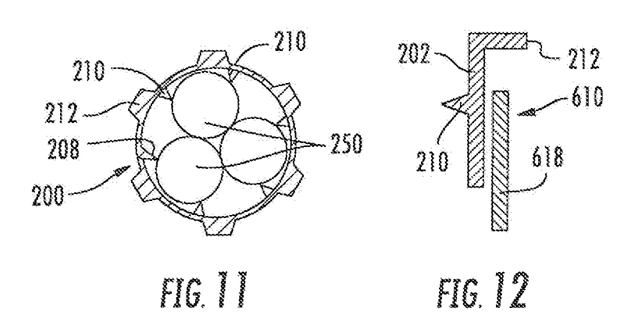
FIG. 11 is a top section view of the cable hanger insert of FIG. 10 in a rolled condition with multiple cables mounted therein.
FIG. 12 is a partial side view of the cable hanger insert of FIG. 11 mounted in a cable hanger such as that of FIGS. 3 and 4.

As can be seen in FIG. 11, the insert 200 can be wrapped around multiple cables 250. The insert 200 can be secured by inserting the latch 208 into one of the slots 206 of the wrapping portion 204. The gripping features 210 extend radially inwardly from the gripping portion 202 and are therefore positioned to penetrate and grip the cables 250. The discontinuity of the flanges 212 enables the insert 200 to be relatively easily bent into the desired shape.

The wrapped insert 200 and cables 250 can then be inserted into a cable hanger such that shown at 610 above, after which the cable hanger 610 can be mounted to a mounting structure in the conventional manner. As shown in FIG. 12, the flanges 212 of the wrapped insert 200 can rest on the upper surfaces of the flex members 618 and/or the gripping members 612, 616 of the cable hanger 610, which can provide additional support and security to the mounting of the insert 200 within the cable hanger 610.

Figure 13:
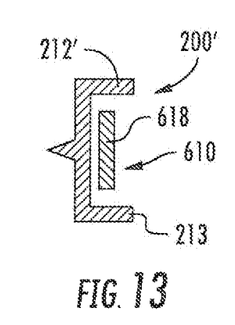
FIG. 13 is a partial side view of a cable hanger insert according to alternative embodiments of the invention mounted in a cable hanger such as that of FIGS. 3 and 4.

FIG. 13 illustrates an alternative cable hanger insert 200' that is similar to the cable hanger insert 200, but which includes flanges 213 on the lower edge of the gripping portion 202' in addition to the flanges 212' on the upper edge of the gripping portion 202'. As can be seen in FIG. 13, the inclusion of both flanges 212' and 213 on the insert 200' enables the insert 200 to grasp the flex members 618 of the cable hanger 610 more tightly.

The inserts 100, 100', 200, 200' may be formed of a variety of materials, such as steel and other metals. The inserts 100, 100', 200, 200' may be stamped from a sheet of material, such as steel, and bent by known methods into the configuration shown in FIG. 5. As such, the inserts 100, 100', 200, 200' may be monolithic components.

Figure 14:
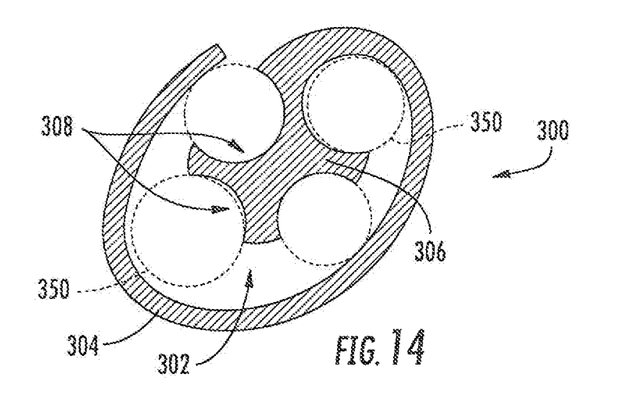
FIG. 14 is a top view of a cable hanger insert according to further embodiments of the invention with cables mounted therein.

Referring now to FIG. 14, another cable hanger insert, designated broadly at 300, is shown therein. The insert 300 includes a central gripping portion 302 and an attached wrapping strip 304. The gripping portion 302 includes a central body 306 with multiple recesses or pockets 308 (the illustrated embodiment includes four pockets 308) sized to serve as receptacles to hold cables 350. The wrapping strip 304 wraps around the cables 350 and can be secured near its fixed end with a latch/slot arrangement, a button/slot arrangement, VELCRO® fasteners, tape or other adhesives, or the like. The insert 300 and wrapped cables 350 can then be inserted into a cable hanger that is then mounted to a mounting structure.

The insert 300 may be formed of a variety of materials, including polymeric and elastomeric materials such as EPDM rubber. The insert 300 may be formed via injection molding, transfer molding, compression molding, 3-D printing, or the like.

Those skilled in this art will appreciate that, although the cable hangers 10, 610 are shown herein, the inserts discussed above may be employed with a variety of cable hanger designs, including others discussed in U.S. Patent Publication No. 2016/0281881 to Vaccaro, supra, and other offered under the SNAP-STAK trade name by CommScope, Inc.

It can be seen that, by using cable hanger inserts such as those shown above, a conventional cable hanger that is designed to grasp a single cable can be used to grasp multiple smaller cables. This capability can provide the technician with great flexibility in mounting cables on an antenna tower or the like. Also, cable hangers with inserts held therein may also stack onto, or receive in stacked fashion, other cable hangers that hold either a single cable in conventional fashion or multiple cables with an insert as described above.

Those skilled in this art will appreciate that other configurations of cable hanger inserts may be suitable for use with cable hangers. For example, the inserts may have more or fewer receptacles/Pockets/undulations than are shown herein. The undulations may be shaped differently. The inserts 100, 100' may include flanges such as those shown at 212 on insert 200 to further support the insert within the cable hanger, as may the insert 300. The inserts 100, 100', 200, 200' may lack a hook/latch and slots for securing of the wrapping portion to the gripping portion, and in some instances may rely on another securing technique. Other options may also be suitable.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A device for mounting one or more cables, comprising:
a strip having a flat section and an undulating portion, the undulating portion comprising a plurality of undulations, each of the undulations extending in a direction above the strip when the strip is disposed in a flat condition;
a hook attached to one end of the strip;
a plurality of slots in the strip;
wherein the strip is configured to be formed into a closed loop, the hook being inserted into one of the plurality of slots to secure the strip into the form of a closed loop;
wherein the device is formed as a unitary member and of a polymeric material; and
wherein the flat section and the undulating portion are of uniform width.

2. The device defined in claim 1, wherein the plurality of slots are positioned in the flat section of the strip.

3. The device defined in claim 1, wherein at least a portion of the undulations are located within the closed loop.

4. The device defined in claim 3, wherein all of the plurality of undulations are located within the closed loop.

5. The device defined in claim 4, wherein a portion of the flat section forms part of the closed loop.

6. The device defined in claim 1, wherein the hook extends generally perpendicularly to the flat section.

7. The device defined in claim 1, wherein the undulations extend in a direction that is generally perpendicular to the flat section.

8. The device defined in claim 1, wherein the plurality of slots are positioned in the flat section of the strip.

9. A device for mounting one or more cables, comprising:
- a strip having a flat section and an undulating portion, the undulating portion comprising a plurality of undulations that extend generally perpendicularly to the flat section in a direction above the strip when the strip is disposed in a flat condition;
- a hook attached to the strip;
- a plurality of slots in the strip;
- wherein the strip is configured to be formed into a closed loop, the hook being inserted into one of the plurality of slots to secure the strip into the form of a closed loop, wherein all of the plurality of undulations are located within the closed loop; and
- wherein the device is formed as a unitary member and of a polymeric material; and
- wherein the flat section and the undulating portion are of uniform width.

10. The device defined in claim 9, wherein a portion of the flat section forms part of the closed loop.

11. The device defined in claim 9, wherein the hook extends generally perpendicularly to the flat section.

* * * * *